Jan. 20, 1931.                E. G. GUNN                 1,789,434
                                BRAKE
                       Filed Dec. 14, 1928         2 Sheets-Sheet 1
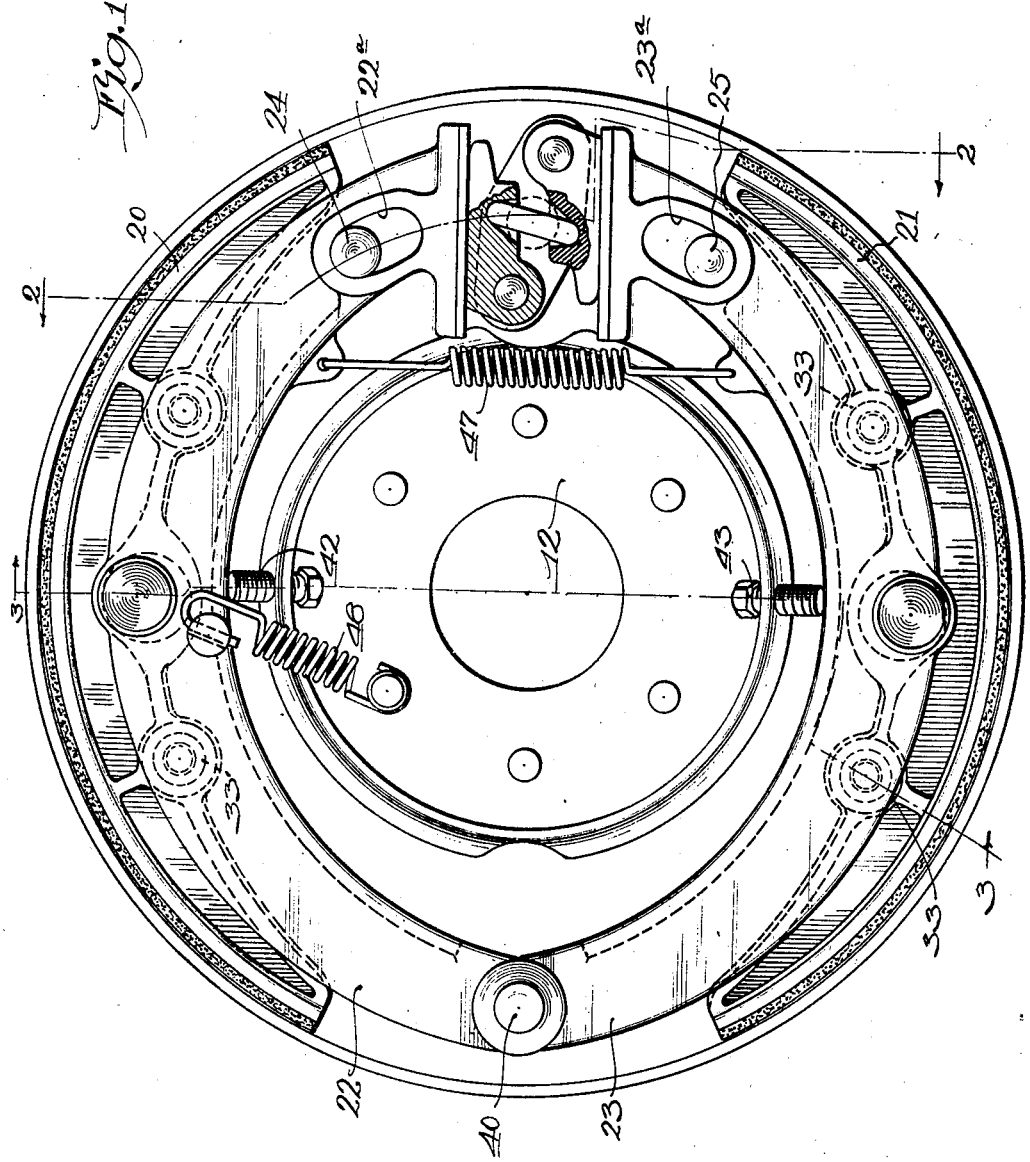

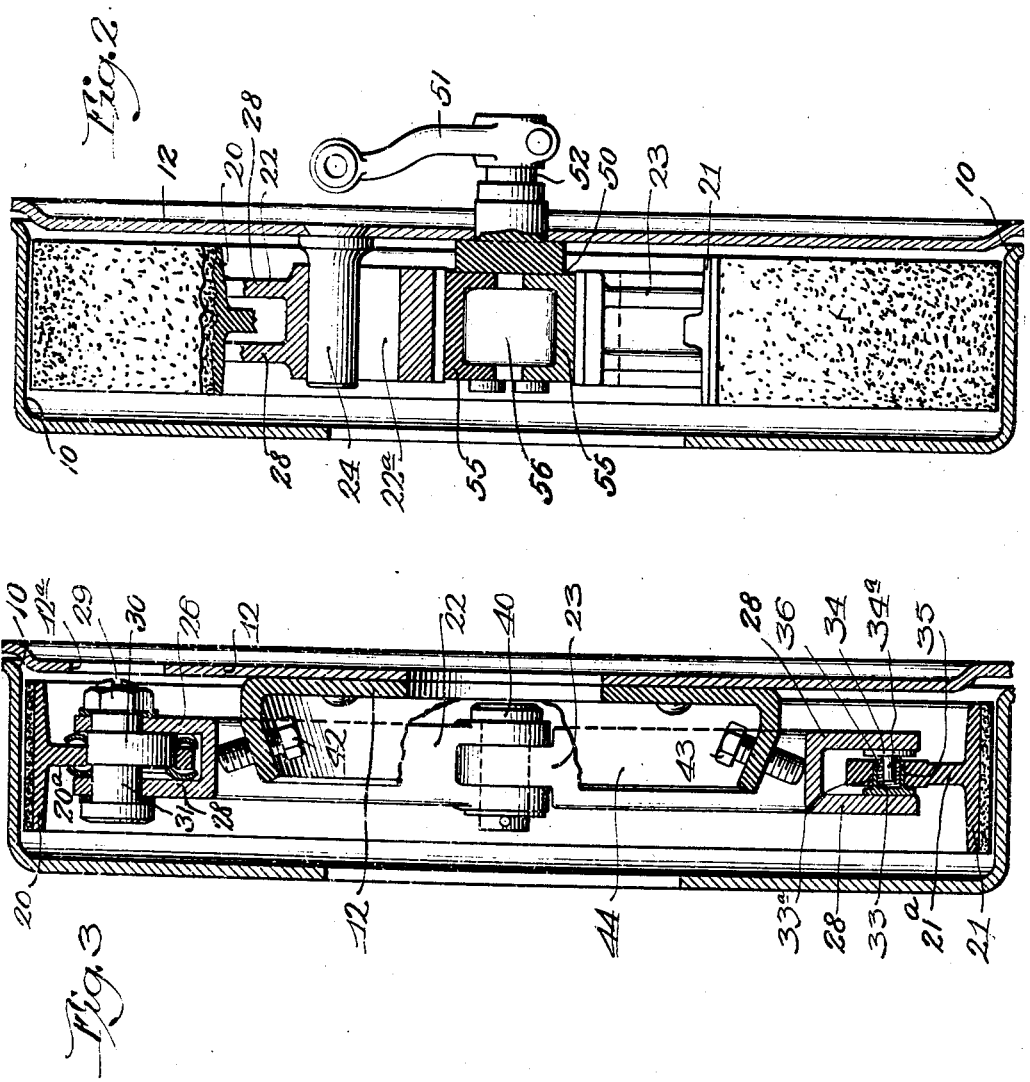

Patented Jan. 20, 1931

1,789,434

UNITED STATES PATENT OFFICE

EARL G. GUNN, OF RACINE, WISCONSIN, ASSIGNOR TO THE NASH MOTORS COMPANY, OF KENOSHA, WISCONSIN, A CORPORATION OF MARYLAND

BRAKE

Application filed December 14, 1928. Serial No. 325,995.

This invention relates to improvements in brake mechanism for motor vehicles, and more particularly to internal shoe brakes having servo action in both directions of rotation of the wheel.

The principal object of the invention is to provide a simple and more efficient construction for brakes of this character wherein the shoes may position themselves properly relative to the brake drum when engaged so as to eliminate many of the objectionable features existing in present constructions.

In a copending application bearing Serial No. 306,332, filed September 17, 1928, I have disclosed a brake of the type above described wherein the shoe sections are each pivotally mounted at a central point upon a brake supporting member so that said shoe is permitted to position itself relative to the brake drum independently of its shoe supporting member.

In the present invention I utilize the same principle of construction, but provide an improved construction and arrangement for positioning the shoe supporting members, and also an improved form of friction device for restraining the shoes from excessive pivotal movement relative to their supporting members.

The invention may best be understood by reference to the accompanying drawings, in which Figure 1 is a front view of a brake constructed in accordance with my invention.

Figure 2 is a detail section of the brake taken on the irregular line 2—2 of Figure 1.

Figure 3 is a detail section taken on line 3—3 of Figure 1.

Referring now to details of the drawings, the brake drum 10 is carried by the wheel in the usual manner and the backing plate 12 is mounted on the wheel spindle, (not shown) having the brake mechanism carried thereon. The braking mechanism shown herein comprises two shoes 20 and 21, each of which is mounted substantially at the central point to curved supporting members 22 and 23, respectively. Each of the supporting members 22 and 23 is formed with enlarged apertures 22a and 23a, respectively, adjacent one end through which anchor lugs 24 and 25 extend, said anchor lugs being suitably supported, as for instance on the backing plate 12, as shown in Figure 2. In the form shown, the supporting members 22 and 23 are each formed of U-shaped members having side plates 28—28 between which the inwardly projecting webs 20a and 21a of shoes 20 and 21, respectively, extend. A pivotal connection is provided between each of the shoes and its respective supporting member at substantially the central point of each shoe, in the form shown said pivotal connections comprising a bearing 30 which, for adjustment purposes, is eccentrically mounted on a pin 31 passing through the side plates 28—28.

Each eccentric bearing 30 is adjustable in several positions by turning its pin 31, which may be accomplished by any suitable tool, as for instance, a screw driver which may be fitted in slot 29, and is locked by nut 36 threaded on the end of the pin 31 so as to draw and hold said eccentric against the inside of the adjacent side plate 28. Apertures 12a, 12a are formed in the backing plate 12 registering with the eccentric bearing so as to afford access to the latter for such adjustment.

Means are also provided for restraining the shoes from excessive pivotal movement on their supporting bearing, said means herein including a plurality of sets of spring pressed friction pads 33 and 34 carried on the webs 20a and 21a of the shoes and adapted to engage the adjacent sides of the side plates 28—28 of supporting members 22 and 23. In the preferred form shown, each of the shoes is provided with two sets of friction pads spaced on opposite sides of their respective pivotal bearings, the pad 33 having a hollow hub 33a fitting loosely within an aperture 35 formed in the web, and the pad 24 having a pin 34a extending within the hollow portion 33a with a coiled spring 36 interposed between said pin and the walls of the hollow hub 33a so as to maintain outward pressure upon both pads 33 and 34, as best shown in Figure 3.

The unanchored ends of the supporting members 22 and 23 are pivotally connected to each other on a pin 40. Suitable stops are provided for limiting the inward movement of the supporting members 22 and 23, in the form shown said stops consisting of set screws 42 and 43 carried on a ring 44 mounted on the backing plate 12 and projecting inwardly therefrom within the limits of said supporting members, as clearly shown in Figures 1 and 3. The ends of the supporting members 22 and 23 adjacent the anchors, are connected by a spring 47 tending to hold said connecting members and their respective brake shoes out of operative engagement with the drum. An auxiliary spring 48 is also connected to one of said supporting members, as for instance, the supporting member 22 so as to tend to provide slightly more tension thereon, depending on the normal direction of rotation of the wheel, as will hereinafter more fully appear.

Braking pressure is applied through suitable means such as an equalizing device indicated generally at 50, in the form shown herein said device comprising an operating lever 51 on the outside of the backing plate and an operating shaft 52 connected therewith, having a cross arm 53 disposed between the ends of the brake supporting members 22 and 23. A pair of equalizing levers 55—55 are pivoted at opposite ends of the cross arms 53 and have their outer faces engaging the ends of said brake supporting members with an equalizing member connecting said equalizing links so as to tend to move the outer engaging faces of said equalizing links in parallel relation in all positions of movement thereof. In the form shown, said equalizing link consists of an elongated rocking member 56 having its opposite ends abutting in opposed inner recesses 55a—55a of the equalizing levers 55—55 as clearly shown in Figure 1.

The operation of the braking apparatus above described is substantially as follows:

In released position, the springs 47 and 48 tend to retract the supporting members 22 and 23 and the brake shoes connected therewith from the drum with the anchor pins engaging the far side of each of the apertures 22a and 23a in said supporting members. Assuming that the drum is normally rotated in a clockwise direction, as shown in Figure 1, and braking pressure is applied, the equalizing member tends to spread the two supporting members apart, but as soon as the shoes 20 and 21 come into engagement with the rotating drum 10 frictional engagement of the parts tends to move both of the shoes and their supports in a clockwise direction. The auxiliary spring 48 serves to maintain the lower shoe 21 normally against its anchor 24 so as to eliminate lost motion between said shoe and anchor when the brake is applied while the wheel is rotated in its normal forward direction. The clockwise movement of the entire braking system thus causes the anchor lug 25 to be released.

Further spreading action of the equalizer is then effected mainly upon the lower shoe supporting member 23, and moves the same together with its brake shoe 21 in a direction circumferentially of the drum at the same time that both shoes are moved radially into further operative engagement with the drum.

It will now be seen that the shoes 20 and 21 being hinged at or near their middle point, are permitted to find their proper braking position relative to the drum regardless of the shifting movement of their supporting members 22 and 23.

It will be observed further that relative rotation of the drum in the opposite direction will give a reverse operation of the parts, the anchor lug 25 then serving as the anchor for the system.

The braking adjusting means herein comprising the eccentric bearing 30 on pin 31, forms the sole adjustment for the brake shoes after the set screws 42 and 43 have been initially adjusted to provide the desired limit of inward movement of the shoe supporting members 22 and 23.

I claim as my invention:

1. In a wheel brake, a drum, a pair of anchors, a pair of oppositely disposed brake supporting members mounted for servo action relative to said anchors and to each other, said brake supporting members being pivotally connected to each other at their unanchored ends, tension means tending to maintain said brake supporting members in released position, and brake shoes pivotally connected substantially at their central points to said shoe supporting members.

2. In a wheel brake, a drum, an anchor and a brake system arranged for servo action relative thereto including a brake supporting member adapted to transmit servo action to adjacent brake members, a brake shoe pivotally mounted on said brake member adjacent the center of said shoe whereby the latter may position itself relative to said drum independently of the position of said brake supporting member, and means for restraining excessive pivotal movement of said brake shoe relative to said brake supporting member comprising a plurality of tensioned friction pads spaced on opposite sides of the point of pivotal connection of said shoes and their supporting members and engaging the latter.

3. In a wheel brake, a drum, an anchor and a brake system arranged for servo action relative thereto including a brake supporting member adapted to transmit servo action to adjacent brake members, a brake shoe pivotally mounted on said brake member adjacent the center of said shoe whereby the latter may position itself relative to said drum independently of the position of said brake supporting member, and means for restraining excessive pivotal movement of said brake shoe relative to said brake supporting member, comprising a plurality of friction pads carried by one of said members and adapted to engage between the opposite faces of the other of said members.

4. In a wheel brake, a drum, a pair of anchors, a pair of oppositely disposed brake supporting members mounted for servo action relative to said anchors and to each other, said brake supporting members being pivotally connected to each other at their unanchored ends, tension means tending to maintain said brake supporting members in released position, and brake shoes each having pivotal connections substantially at their central points to said shoe supporting members, said pivotal connections being eccentrically mounted as to one of their associated members and adjustable by rotation to vary the normal clearance between said shoes and said drum.

Signed at Racine, Wis., this 11th day of December 1928.

EARL G. GUNN.